US006801224B1

(12) United States Patent
Lewallen

(10) Patent No.: US 6,801,224 B1
(45) Date of Patent: Oct. 5, 2004

(54) METHOD, SYSTEM, AND PROGRAM FOR GENERATING A GRAPHICAL USER INTERFACE WINDOW FOR AN APPLICATION PROGRAM

(75) Inventor: Stephen Richard Lewallen, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 347 days.

(21) Appl. No.: 09/661,610

(22) Filed: Sep. 14, 2000

(51) Int. Cl.[7] .............................................. G09G 5/00
(52) U.S. Cl. ...................... 345/746; 345/744; 345/788; 345/804
(58) Field of Search ................................ 345/749, 744, 345/738, 788, 799, 800, 804, 746, 733; 709/328, 329

(56) References Cited

U.S. PATENT DOCUMENTS

| | | | | |
|---|---|---|---|---|
| 4,961,133 A | * | 10/1990 | Talati et al. ................ | 717/148 |
| 5,613,090 A | * | 3/1997 | Willems ..................... | 709/329 |
| 5,831,609 A | * | 11/1998 | London et al. ............. | 345/746 |
| 6,016,392 A | | 1/2000 | Jordan | |
| 6,229,537 B1 | * | 5/2001 | Sobeski et al. ............. | 345/803 |
| 6,272,493 B1 | * | 8/2001 | Pasquali ..................... | 707/10 |
| 6,313,854 B1 | * | 11/2001 | Gibson ...................... | 345/788 |
| 6,342,905 B1 | * | 1/2002 | Diedrich et al. ........... | 345/746 |
| 6,356,957 B2 | * | 3/2002 | Sanchez et al. ............ | 709/328 |
| 6,545,691 B1 | * | 4/2003 | Vallejo ....................... | 345/804 |
| 6,570,590 B1 | * | 5/2003 | Dubrow et al. ............ | 345/751 |
| 6,683,629 B1 | * | 1/2004 | Friskel et al. ............... | 345/804 |

OTHER PUBLICATIONS

W3C. "Document Object Model (DOM) Level 1 Specification." Oct. 1, 1998. Version 1. [retreived on Mar. 18, 20003]. Retrieved from the Internet <URL: http://www.w3.org/DOM/>.*

U.S. patent application Ser. No. 09/568,873, filed May 9, 2000, entitled "Method, System, and Program for Mapping Standard Application Program Interfaces (APIs) to User Interface APIs".

U.S. patent application Ser. No. 09/567,836, filed May 9, 2000, entitled "Method, System, and Program for Mapping Objects in Different Language Formats".

U.S. patent application Ser. No. 09/567,835, filed May 9, 2000, entitled "Method, System, and Program for Using a User Interface Program to Generate a User Interface for an Application Program".

Microsoft Corporation, "The Component Object Model Specification", Version 0.9, Oct. 24, 1995.

(List continued on next page.)

Primary Examiner—John Cabeca
Assistant Examiner—Blaine Basom
(74) Attorney, Agent, or Firm—David W. Victor; Konrad, Raynes & Victor LLP

(57) ABSTRACT

Described is a method, system, and program for generating an application graphical user interface (GUI) window used by an executing application program. The application program uses an operating system handle addressing the application GUI window to generate content into the application GUI window. A frame element, including GUI components of the application GUI window is added to a user interface object including GUI components used by a user interface program. Application program interfaces (APIs), generated by the application program, are executed to call the handle to generate content into the application GUI window. Standard APIs that are members of a set of standard API interfaces are received to manipulate the GUI components in the frame element to modify a display of the application GUI window. The standard APIs are converted to user interface APIs. The converted user interface APIs call the frame element to render the application GUI window according to the modifications specified in the standard APIs.

27 Claims, 7 Drawing Sheets

OTHER PUBLICATIONS

J. Robie, "What is the Document Object Model?", Texcel Research, REC–DOM–Level–1–19981001, pp. 1–5, [retrieved on Feb. 7, 2001]. Retrieved from the Internet <URL: http://www.w3.org/TR/REC–DOM–Level–1/introduction.html>.

C. Verbowski, "Integrating Java and COM", Microsoft, Corporation, Jan. 1999, pp. 1–10.

Microsoft Corp., "Document Object Model Overview", copyright 2000, pp. 1–10, [retrieved on Feb. 6, 2001]. Retrieved from the Internet <URL: http://www.microsoft.com>.

IBM Corp., "SOMobjects", referring to The System Object Model (SOM) and the Component Object Model (COM), Jul. 7, 1994, pp. 1–5 [originally retrieved on Feb. 6, 2000, this copy retrieved on Sep. 14, 2001]. Retrieved from the Internet <URL: http://www–4.ibm.com/software/ad/som/library/somvscom.html>.

"QueryInterface", pp. 1–5, [retrieved on May 1, 2001]. Retrieved from the Internet.

"Interface Attributes", pp. 1–2, [retrieved on May 1, 2001]. Retrieved from the Internet.

C. Verbowski, "Using COM Objects from Java", Microsoft, Corporation, Feb. 1999, pp. 1–34.

Microsoft Corp., "The Component Object Model: A Technical Overview", copyright 2000, pp. 1–20, [retrieved on Feb. 6, 2001]. Retrieved from the Internet <URL: http://msdn.microsoft.com/library/techart/msdn_comppr.htm.

I. Kushnirskiy, "Java–to–XPCOM Bridge", Sep. 18, 2000, pp. 1–2, [retrieved on Feb. 7, 2001]. Retrieved from the Internet <URL: http://www.mozilla.org/projects/blackwood/connect/>.

* cited by examiner

METHOD, SYSTEM, AND PROGRAM FOR GENERATING A GRAPHICAL USER INTERFACE WINDOW FOR AN APPLICATION PROGRAM

CROSS-REFERENCE TO RELATED APPLICATIONS

This application is related to the following co-pending and commonly-assigned patent applications, all of which were filed on May 9, 2000, and all of which are incorporated herein by reference in their entirety:

"Method, System, And Program For Mapping Standard Application Program Interfaces (APIs) to User Interface APIs" to Stephen R. Lewallen, having attorney docket no. STL000003US1, U.S. application Ser. No. 09/568,873; and "Method, System, And Program For Using a User Interface Program to Generate a User Interface for an Application Program" to Stephen R. Lewallen, having attorney docket no. STL000004US1, U.S. application Ser. No. 09/567,835; and "Method, System, and Program for Mapping Objects in Different Language Formats" to Stephen R. Lewallen, having attorney docket no. STL00002US1, U.S. application Ser. No. 09/567,836.

BACKGROUND OF THE INVENTION

1. Field of the Invention

Preferred embodiments provide a method, system, and program for implementing an application program graphical use interface (GUI) window.

2. Description of the Related Art

A "plug-in" program is a software application program that extends the capabilities of a web browser program. Web plug-ins execute within a browser program and are called to render content of a file type that the browser cannot handle, such as certain audio, video, animation, multimedia, and special image viewing files. When the server informs the web browser of the media type of the object being downloaded, the browser consults its internal tables to see if a plug-in application is provided for the content type. If so, the browser either displays the object inside the browser window, i.e., embeds the window into which the plug-in generates content within the web browser or invokes the plug-in to handle the object as a separate stand-alone program.

The Netscape Navigator web browser from Netscape Communicator integrates the plug-in into the web browser so that the plug-in application appears to be embedded within the displayed web browser user interface.** For instance, instead of invoking the application plug-in to run as a separate stand alone program, the Netscape Navigator browser calls the plug-in internally to play the movie directly within the browser window. Such internally called plug-ins execute within a limited area of execution within the web browser and cannot utilize many of the web browser features outside of their limited area of execution. For instance, movie and audio player programs embedded as plug-ins in a web browser cannot be resized or repositioned as the general web browser window.

Thus, it would be desirable to embed a plug-in into a web browser window to appear integrated with the web browser and allow the plug-in application to implement many of the web browser graphical user interface (GUI) component abilities, such as the capability to resize and reposition the embedded plug-in.

SUMMARY OF THE PREFERRED EMBODIMENTS

To overcome the limitations in the prior art described above, preferred embodiments disclose a method, system, and program for generating an application graphical user interface (GUI) window used by an executing application program. The application program uses an operating system handle addressing the application GUI window to generate content into the application GUI window. A frame element, including GUI components of the application GUI window is added to a user interface object including GUI components used by a user interface program. Application program interfaces (APIs), generated by the application program, are executed to call the handle to generate content into the application GUI window. Standard APIs that are members of a set of standard API interfaces are received to manipulate the GUI components in the frame element to modify a display of the application GUI window. The standard APIs are converted to user interface APIs. The converted user interface APIs call the frame element to render the application GUI window according to the modifications specified in the standard APIs.

In further embodiments, the user interface program may comprise a web browser program and the application program comprises a plug-in module that provides services and features to the web browser program. Still further, the application GUI window may be generated as embedded in a user interface GUI window. Further, the set of standard API interfaces may be part of the W3C Document Object Model (DOM) specification and the user interface program may implement the W3C DOM.

Preferred embodiments provide a methodology for adding an element, such as an IFRAME element, defining a window used by an application program, such as a plug-in, into a user interface object, such as a web browser DOM tree. This allows the GUI window used by the application program to be manipulated by user interface APIs implementing the W3C APIs. In this way, the rich and varied user interface features of the W3C, such as Cascadable Style Sheets, implemented by the web browser program can be applied to the window in which the plug-in application renders content.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which illustrate several embodiments of the present invention. It is understood that other embodiments may be utilized and structural and operational changes may be made without departing from the scope of the present invention.

Figure 1:
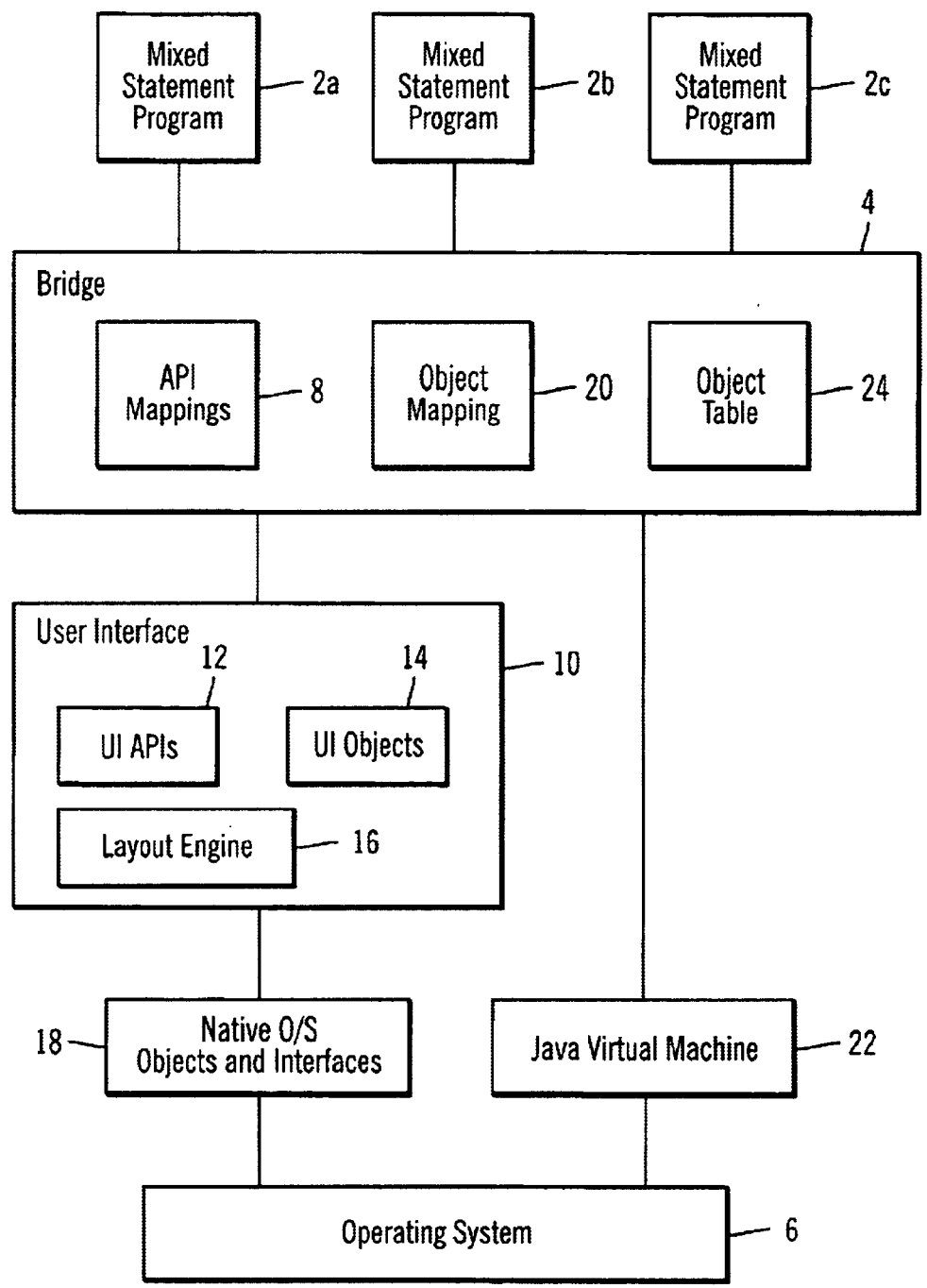
FIG. 1 illustrates elements of the computer architecture in which preferred embodiments are implemented.

FIG. 1 illustrates the components of the computer architecture in which preferred embodiments are implemented. Mixed statement programs 2a, b, c, comprise programs written in the Java programming language, or any other cross-platform language, that may include the standard API interfaces developed by the World Wide Web Consortium (W3C) for the Document Object Model (DOM) application programming interface (API). Thus, these programs 2a, b, c include language statements from different programming languages or protocols, such as Java and non-Java standard API interfaces, such as the W3C API interfaces.

The DOM model is a standard interface used to define the structure of documents, particularly HTML and XML documents. In the DOM specification, the term "document" is used in the broad sense to include the components of a textual document as well as components of an application program. The DOM interface represents the document or application program as a hierarchical arrangement of nodes. All the components of an HTML or XML document, including data as well as program elements, such as the user interface elements, can be expressed as hierarchically arranged nodes. The W3C DOM specifications provide API interfaces to access, change, delete or add nodes to the DOM representation of a document, or application program. The API interfaces specified in the DOM specifications are referred to herein as "W3C API interfaces."

In preferred embodiments, the mixed statement programs 2a, b, c may incorporate the W3C API interfaces of DOM specifications, such as the DOM level 1 Core, including DOM Level 1 HTML, which provides W3C interfaces representing all of the HTML 4.0 elements, DOM Level 2 Core which comprises modifications to DOM Level 1, DOM Level 2 Cascading Style Sheets, etc. Many browsers such as Microsoft Internet Explorer version 4.0 and Mozilla based browsers, such as Netscape Communicator version 6.0, implement the W3C DOM Level 1 HTML interface, as well as Cascading Style Sheets. In this way, developers creating mixed statement programs 2a, b, c may utilize the W3C API interfaces as specified in the W3C specifications, such as the "Document Object Model (DOM) Level 1 Specification, Version 1.0" (Oct. 1, 1999) and "Document Object Model (DOM) Level 2 Specification, Version 1.0" (Dec. 10, 1999), which are incorporated herein by reference in their entirety, and which include the DOM Level 1 HTML, DOM Level 2 Core, DOM Level 2 CSS, DOM Level 2 Views and Events, DOM Level 2 HTML, DOM Level 2 Stylesheets, DOM Level 2 CSS, DOM Level 2 Traversal, etc.

After the mixed statement programs 2a, b, c are written to include Java programming language statements as well as W3C API interface calls, the mixed statement program 2a, b, c is processed by a bridge 4. The bridge 4 maintains an API mapping 8 of W3C API interfaces to the corresponding implementation of the W3C API interface in a user interface (UI) program 10 that implements the DOM, such as Internet Explorer, Netscape Communicator and Navigator, Mozilla, the Scalable Vector Graphics format used by Adobe Systems, Inc., or any other user interface that implements the DOM.

The user interface program 10 includes user interface (UI) APIs 12 that are used to manipulate user interface (UI) objects 14 that implement the elements and components of the observable user interface features produced by the user interface program 10. A user interface layout engine 16 would transform the UI APIs 12 and UI objects 14 to the native operating system objects and interfaces 18 on which the browser layout engine 16 was written to operate. For instance, Internet browsers, such as Internet Explorer and Netscape Navigator, include different layout engines for different operating systems to transform the user interface APIs 12 and objects 14 to native operating systems objects and interfaces 18. The browser layout engine has all the mappings to access and control the native operating system. The Mozilla browser layout engine, referred to as the Next Generation Layout (NGLayout) or Gecko layout engine, processes the API functions that implement the W3C DOM Level 0, Level 1, and Level 1 HTML, as well as cascading style sheets and other DOM standards, and generates the native operating system calls to execute the requested operation.

The bridge 4 API mapping 8 would include for each supported W3C API interface, the corresponding UI API 12 interface in the user interface program 10. In preferred embodiments, the API mapping 8 would map the Java class names to the unique identifiers of the user interface APIs 12. The user interface APIs 12 would in turn manipulate browser objects, such as browser COM objects.

The bridge 4 further includes an object mapping 20 of Java objects, that may be called from within the mixed statement programs 2a, b, c. The mixed statement programs 2a, b, c would include a W3C API interface call to a Java object, which maps to a corresponding UI COM object 14 in the user interface 10. The mixed statement programs 2a, b, c may include W3C API calls instantiating and manipulating Java objects, that map to UI objects 14 in the user interface 10. For instance, the object mapping 10 for Internet Explorer describes the mapping of Java objects to COM objects, whereas for Mozilla based browsers the mapping 10 is to XPCOM objects in the Mozilla browser. The bridge 4 uses the API 8 and object 20 mappings to transform W3C API interfaces in the mixed statement programs 2a, b, c to the corresponding user interface APIs 12 and objects 14 that can be executed directly by the user interface layout engine 16, which would then access the underlying operating system interfaces and objects 18 to execute the action. The bridge 4 will forward Java language statements to a Java Virtual Machine (JVM) 22 to process. Thus, in preferred embodiments, the bridge 4 separately processes the Java language statements to generate bytecodes executable by the native operating system and separately processes the W3C API interfaces to produce language statements and object code that the user interface 10 can directly execute.

The W3C API interfaces include numerous methods to implement objects in the user interface 10. By exposing a Java program, or mixed statement programs 2a, b, c, to the W3C API interfaces, a mixed statement program 2a, b, c including Java program statements can access any user interface feature and object that the user interface program 10 is capable of implementing. Thus, with the preferred computer architecture, the Java program is no longer constrained to the Java programming space, and may extend the Java program to other objects and programs available in commonly used user interface programs. For instance, the mixed statement programs 2a, b, c may include the W3C HTML API interfaces to implement a user interface using the underlying UI objects 14 supported in the user interface 10. With this approach, the mixed statement programs 2a, b, c can generate a user interface that has the same look-and-feel as the commonly used user interface 10 with which the user is intimately familiar.

Because the bridge 4 maps to user interface APIs 12, the mixed statement programs 2a, b, c may execute on any operating system on which the user interface 10 may execute. The user interface layout engine 16 will handle the conversion of the browser APIs 12 and objects 14 to the specific operating system 6 platform.

Figure 2:
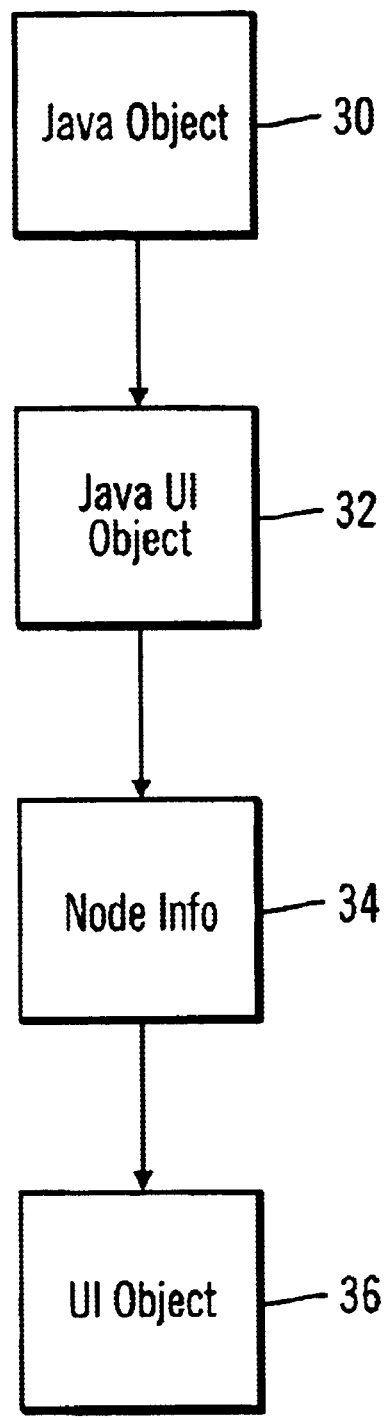
FIG. 2 illustrates data structures used to link a Java object to a user interface object in accordance with preferred embodiments of the present invention.

As discussed the object mapping 20 exposes user interface objects 14 to the mixed statement programs 2a, b, c to provide Java applications access to the user interface 10 functions and elements. The object mapping 20 provides a linkage of an instance of a user interface object 14, e.g., COM object, XPCOM object, etc., to a corresponding Java object that may be manipulated by the mixed statement program 2a, b, c. When a W3C API interface is used in a mixed statement program 2a, b, c to instantiate an instance of a Java object that corresponds to a native operating system object, the Bridge 4 would generate the Java native object 32 and node info object 34 data structures illustrated in FIG. 2 to provide a linkage between the Java object 30 and the corresponding user interface (UI) object 36. The node info object 34 comprises a pointer to the instantiated UI object 36. The Java native object 32 has a pointer to the node info object 34. The Java object 30 inherits all the properties of the Java native object class and can access all the functions implemented in the Java native object class. In this way, the Java object 30 is bound to the corresponding UI object 36 through the Java native object 32 and the methods that allow the Java object 30 to access the node info object 34, which can then be used to access the UI object 36.

In preferred embodiments, the bridge 4 maintains an object table 24 (FIG. 1), which includes the value of the pointer for any native operating system object, e.g., COM object, linked to a Java object. The bridge 4 uses the object table 24 to avoid creating multiple instances of the same Java object. If a pointer to a user interface object is listed in the table 24, then the bridge 4 will have the API function calling such object use the already existing instance of the object instead of instantiating an additional instance of the same object.

Figure 3A:
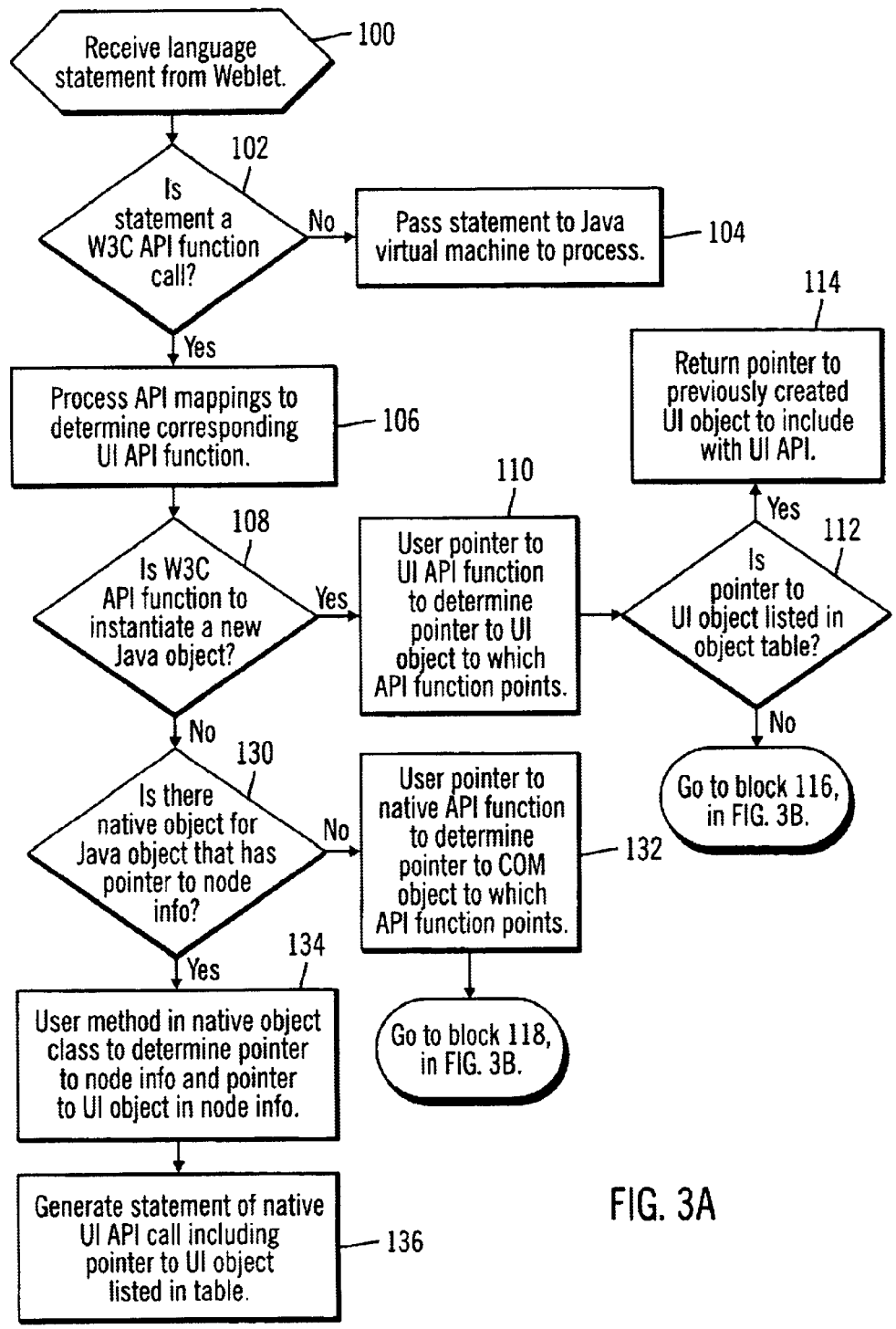
FIGS. 3a, b illustrate logic to transform Java program language statements to code that can be directly executed by the native operating system in accordance with preferred embodiments of the present invention.

FIGS. 3a, b illustrate logic implemented in the bridge 4 to process language statements in the mixed statement programs 2a, b, c. Control begins at block 100 with the bridge 4 receiving a language statement in one mixed statement program 2a, b, c. The bridge 4 determines (at block 102) whether the statement is a W3C API function call for which there is an API mapping 8. If not, then the bridge 4 passes (at block 104) the statement to the Java virtual machine 22 to transform to native machine code, i.e., bytecodes. Otherwise, the bridge 4 processes (at block 106) the API mappings 8 to determine the corresponding user interface API 12 function call, which may comprise the GUID of the API function call. If the UI API 12 function is to instantiate a new UI object 14 (at block 108), then the bridge 4 uses (at block 110) the pointer to the API function call to determine the pointer to the UI 14 object in a manner known in the art. The bridge 4 then determines (at block 112) whether the pointer to the UI object 14 is listed in the object table 18. If so, the bridge 4 returns (at block 114) the pointer to the UI object 14 listed in the object table 18 to the user interface API 12 function, and then would proceed back to block 100 to process further statements in the mixed statement program 2a, b, c. This ensures that the bridge 4 would never create UI objects 14 for the same intended object in order to maintain the uniqueness of each UI object 14. Otherwise, if there is not a pointer to the UI object 14 listed in the object table 18, then control proceeds to block 116 in FIG. 3b to generate UI APIs 12 and the accompanying linkage data structures from the corresponding Java object 30 to a new UI object 36.

Figure 3B:
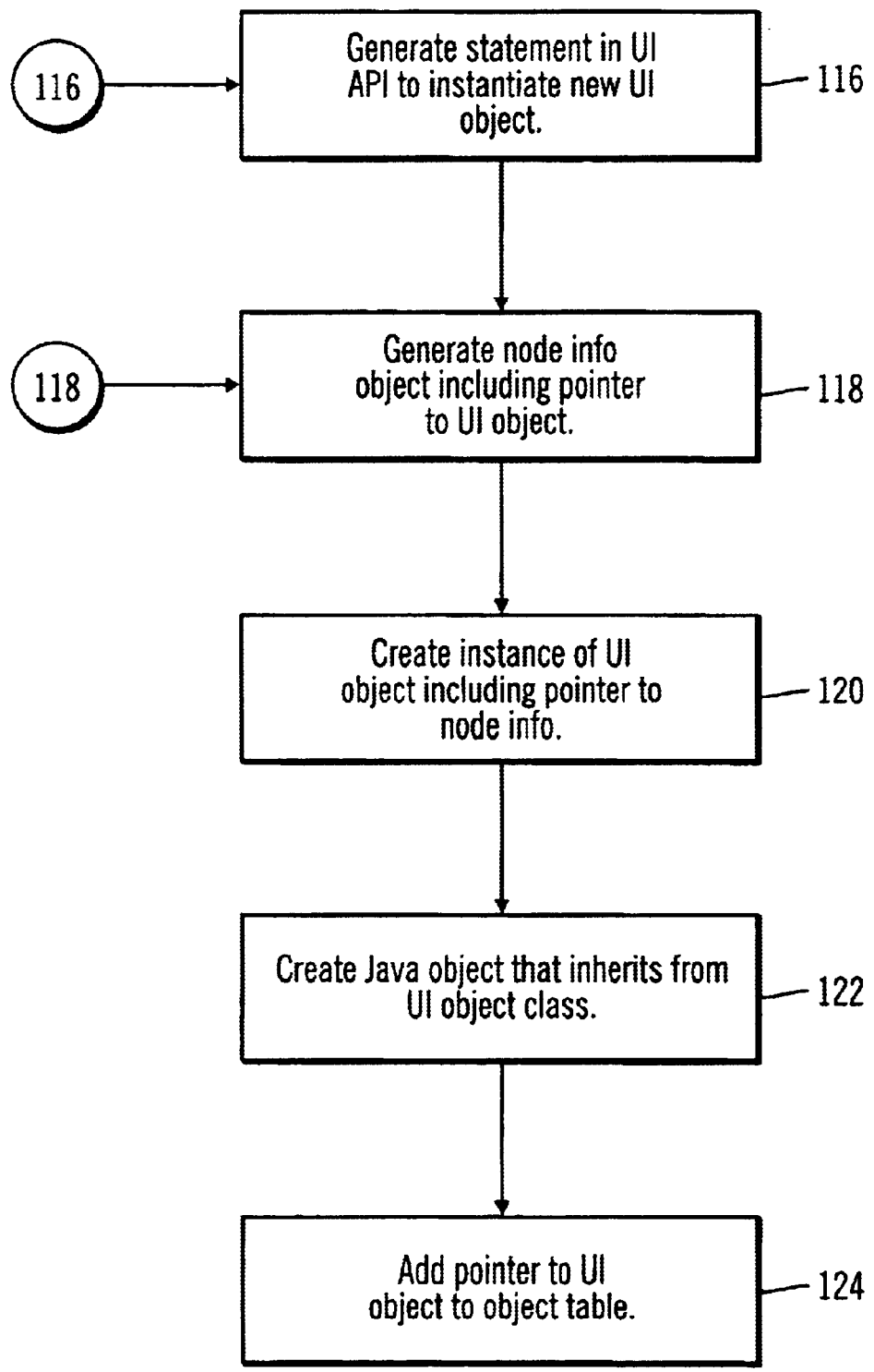

At block 116 in FIG. 3b, the bridge 4 generates the UI API function 12 to create a new instance of the UI object 14. The bridge 4 then creates (at block 118) a node info object 34 that includes a pointer to the instantiated UI object 36. A Java user interface (UI) object 32 is created (at block 120) to implement the Java UI object class and includes a pointer to the node info object 34. The Java object specified in the W3C API function instantiating the Java object is then created and defined (at block 122) to inherit from the Java UI object class. In this way, an instance of the Java object and instances of the Java UI object 32 and node info object 34 are created to provide linkage from the Java object 30 to the corresponding UI object 36. The pointer to the new UI object 36 is then added (at block 124) to the object table 24 to ensure that additional instances of the same UI object are not created. From block 124, control would transfer back to block 100 to process any further statements in the mixed statement program 2a, b, c.

If, at block 108 in FIG. 3a, the bridge 4 determines that the W3C API function call is not to instantiate a new Java object, then the bridge 4 further determines (at block 130) whether there is a Java UI object 32 for the Java object 30 that includes a pointer to a node info object 34. If a Java UI object 32 has not yet been created for the Java object 30, then the bridge 4 uses the pointer to the UI API function 12 determined from the API mappings 8 to determine (at block 132) the pointer to the UI object 14 to which the UI function interfaces. From block 132, control proceeds to block 118 in FIG. 3b to create the linkage data structures from the Java object 30 specified in the W3C API function call to the existing UI object 36.

If, at block 130, there is already a Java UI object 36 for the Java object 30 in the W3C API function call, then the bridge 4 uses (at block 134) a method in the Java UI object class to determine the pointer to the node info object 34 from the Java UI object 32 for the Java object 30 called in the W3C API function. The functions in the Java UI object class are also used to query the node info object 34 to determine the pointer to the UI object corresponding to the Java object. After obtaining the pointer to the UI object, the bridge 4 then constructs (at block 136) a statement comprising the determined user interface function call including the pointer to the UI object determined from the node info object 34, resulting in a user interface function call to a UI object.

In further embodiments, it is possible that multiple UI objects and interfaces are used to implement a single W3C class. In such case, the bridge 4 would create an additional data structure referred to as a proxy object to which the node info object points. This proxy object would in turn include pointers to multiple UI interfaces providing access to one or more UI objects that implement the W3C interface. In this way, the proxy object exposes the Java object and corresponding W3C API interface to one or more UI interfaces and objects. When processing calls to such a Java object, the bridge 4 would transform the call to the Java object to the multiple UI API interfaces specified in the proxy object to which the node info for the Java object points.

The result of the logic of FIGS. 3a, b is that the bridge transforms W3C API function calls added to mixed statement programs 2a, b, c to the implementation of those W3C calls in the user interface 10. Preferred embodiments exploit the fact that many current user interfaces, such as Mozilla browsers, Microsoft Internet Explorer version 5, Adobe Scalable Vector Graphics, etc., implement the W3C DOM interfaces. A program developer may then include W3C API calls in a mixed statement program also including Java language statements to directly access the user interface objects maintained in the operating system. Preferred embodiments thus allow Java developers to extend Java programs beyond the Java runtime environment and utilize existing structures and objects implemented in the operating system. This preferred embodiment computing architecture allows a Java program, such as an Applet, to be a full citizen of the operating system as the mixed statement program 2a, b, c can access any user interface program 10 interface and object defined in the operating system that implements a W3C API interface.

In preferred embodiments, the mixed statement programs may execute using multithreading techniques known in the art to concurrently execute multiple mixed statement programs in a single browser or web page.

Further, with the preferred embodiment architecture, the Java developer may expose data in any object accessible to the user interface, including DOM trees, to java tools. For instance, the mixed statement program may include Java Database Connectivity (JDBC**) calls to perform queries to access data from a database. The program could then include W3C API interface calls to insert database records returned from the JDBC calls into the DOM for a displayed HTML page to display the returned data in the HTML page. Alternatively, the mixed statement program may call a Java Bean application to perform various calculations or operations on data, and then include W3C API interfaces to insert the results of the operation from the Java program in the HTML DOM to display in the web page.

The bridge 4 may be included in a Java Development Kit (JDK) or Java Runtime Environment (JRE) package for a specific operating system, e.g., Linux, Windows, OS/2, or any other supported operating system platform. The API mappings 8 would map each supported W3C API interface to the corresponding implementation of that interface in a user interface capable of executing on the specific operating system. In this way, the mixed statement program can execute on any operating system for which there is a version of the JDK or JRE including the bridge 4 and API mappings 8.

Using the W3C Interface to Manipulate the DOM

The above implementation concerned the general mapping of W3C API interfaces to user interface APIs 12 to manipulate the user interface objects 14 from a Java mixed statement program. Another aspect of the DOM is that it allows a document, or program or any component in the system to be expressed as a hierarchical relationship of objects that may separately be manipulated. Each element is maintained with attributes of the element. This allows a user to delete, add, or change an element, change its content or add, delete or change an attribute. For instance, the different parts of a document, such as sections, images, chapters, etc., may each be expressed as a DOM element in a hierarchical tree of DOM elements that define the entire document. Further, an HTML page may be expressed in a DOM tree where the elements of the HTML page, including user interface elements and program components, are expressed in a hierarchical relationship. The DOM makes all of the objects in a page, e.g., and HTML or XML page, such as images, forms, and even CSS properties, accessible to an application program. Various W3C API functions are available for manipulating DOM objects arranged in a hierarchical relationship. By manipulating particular DOM objects of an HTML page using W3C API interfaces or their corresponding implementation in a particular web browser or operating system, the user may specifically alter particular sections of the HTML page by manipulating the element(s) without affecting other sections of the HTML page defined in other elements.

Currently, the DOM is widely accepted as a standard for defining components within documents and applications, especially those related to the Internet, such as XML and HTML documents. In fact Microsoft Explorer 5.0 and Mozilla implement HTML using the DOM model and APIs. Further details of expressing document and application components in a DOM tree are described in the DOM specifications incorporated by reference above.

With the preferred embodiment bridge 4, a developer may use W3C API interfaces to implement the elements of a program or document, e.g., web browser, HTML page, user interface, etc., in a DOM tree and control the user interface through W3C API interfaces that manipulate the nodes of the DOM that implement the user interface. The W3C includes specific API interfaces to access, manipulate, create, modify and destroy node elements in a DOM tree. In such case, the API mappings 8 would include mappings for W3C API interfaces to access and manipulate nodes in a DOM tree to the corresponding command in the underlying browser or native operating system. In this way, the program developer may insert W3C API interfaces in a mixed statement program to manipulate a DOM implemented by the user interface program 10, which the bridge 4 would transform to API interfaces in the user interface program 10.

With the preferred embodiment architecture, the program developer can access the browser layout engine to generate the user interface for a program written in a different program language, such as Java. This allows the program developer to "draw" the user interface using use the HTML browser on the user's system to provide a user interface that has the same "look-and-feel" presented by the installed browser. Moreover, by using the APIs of the browser, the bridge 4 does not have to be capable of providing the transformation to native operating system machine code as all such transformations are handled by the web browser's layout engine. Such implementations of the bridge to interface with the browser engine frees the Java programmer from the Java "look-and-feel" and the limitations of the Java AWT and Swing kits. With preferred embodiments, the look-and-feel of the mixed statement program would have the same user interface and look-and-feel of the browser already installed on the user's system.

With the preferred embodiments, a program developer may write the user interface using the W3C API interfaces related to HTML and the program logic in Java. Using the W3C interfaces, the mixed statement program could include event listeners to modify the HTML page upon the occurrence of certain events such as user input. Another way to write the mixed statement program is to embed the program in an empty HTML page in a manner similar to a Java Applet. During runtime, the mixed statement program embedded in a Web page like an Applet may dynamically add buttons, tables, text and graphics to the HTML page by manipulating the HTML DOM. Still farther, the mixed statement program may include a combination of preconstructed HTML elements for the user interface as well as adding elements by manipulating the DOM. Yet further, the program can be written to run as a standalone application, using the HTML elements to generate a separate GUI window, like any other operating system window. In such case, the mixed statement program may utilize the browsers engine to generate the user interface without necessarily having the look and feel of a typical HTML page, including the browser chrome.

In preferred implementations, the bridge 4 including its API mappings would be implemented in different packages to interface with different operating system platforms. Thus, the Bridge may be included in the JRE and JDK kits for each operating system platform that supports Java to map the W3C API interfaces to the native operating system API interfaces. Further, the bridge may be implemented in the Java code included with Java enabled browsers to map the W3C APIs to the API interfaces used by the browser engine. This would allow a user to download a mixed statement program through the web browser and execute the mixed statement program in the web browser. The executing mixed statement program, through the Bridge, would issue W3C API calls that are mapped to the corresponding browser implementation of those calls. The browser layout engine would then directly execute the mapped API calls to generate the user interface and manipulate components Embedding an Application Program in the DOM Tree In the DOM specification, the IFRAME inline element is used to embed a document directly into a primary HTML document. The IFRAME element may be a target frame "selected" by a user agent as the focus for printing, viewing HTML source, etc. Thus, an HTML page may be divided into separate frames. A document embedded in an IFRAME is entirely independent of the document in which it is embedded. For instance, relative URIs within the embedded IFRAME document resolve according to the base URI of the embedded document, not that of the main document. Thus, an embedded document is rendered within another document (e.g., in a subwindow); it remains otherwise independent.

Figure 6A:
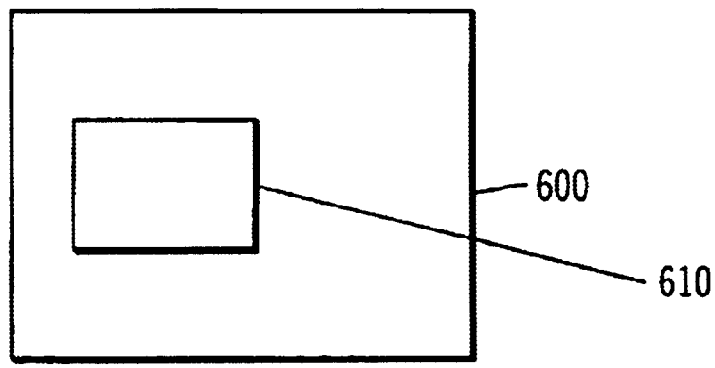
FIGS. 6A, 6B, and 6C to illustrate an application GUI window embedded within a browser window.
Figure 6B:
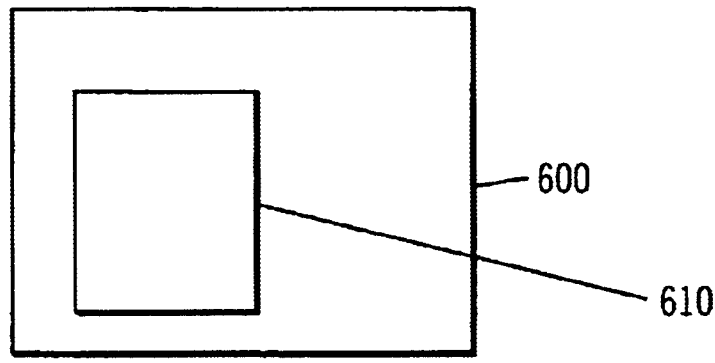
Figure 6C:
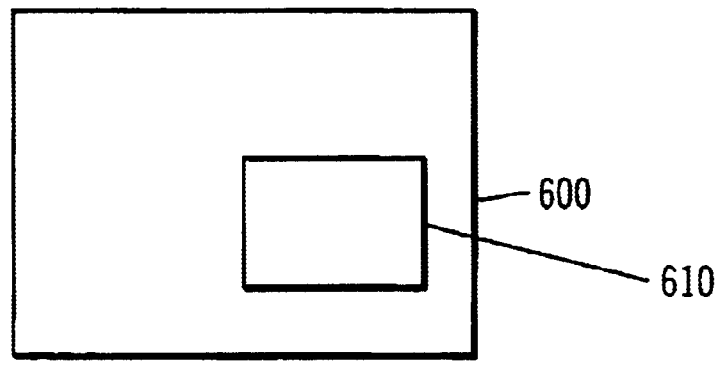

FIGS. 6A, 6B, and 6C to illustrate a GUI window 610 embedded within a browser window 600. Preferred embodiments provide a technique for allowing separate application programs, such as plug-ins, to draw their content into an IFRAME DOM element, thereby making all other DOM W3C APIs available to manipulate the display of the plug-in GUI window 610 as any other DOM display. In preferred embodiments, the IFRAME element is a node within the general DOM object for the user interface, which also includes the GUI components for the user interface, e.g., the Internet Explorer or Mozilla DOM for the displayed browser 600. This architecture allows the window displaying the plug-in content to be manipulated using supported W3C APIs, such as Cascading Style Sheet features. The IFRAME window displaying the plug-in content may be resized and repositioned in response to user generated events as other IFRAMEs supported by the web browser.

Many plug-in applications do not support the DOM, and instead interact directly with the underlying browser and operating system components to present content. For instance, in the Microsoft Windows environment, the Apple Computer, Inc. QuickTime movie player directly accesses the Windows' window handles object to draw movie images into a window frame.** In the Windows operating system, a window handle is the unique identifier that is used to call functions, such as APIs, that manipulate the GUI window identified by the window handle. Other operating systems include similar mechanisms for associating an application program with a GUI window. For instance, the Apple Computer Macintosh Operating System uses an object referred to as a "view" into which the application program writes content and data. Plug-in programs include APIs that use the operating system window handle to directly write content into the GUI window used by the plug-in.

** Java and JDBC are trademarks of Sun Microsystems, Inc.; Microsoft and Windows are registered trademarks of Microsoft Corporation; OS/2 is a registered trademark of International Business Machines Corporation; Netscape is a registered trademark and Netscape Communicator, Netscape Navigator, Mozilla are trademarks of Netscape Communications Corporation; QuickTime is a trademark of Apple Computer, Inc.

Figure 4:
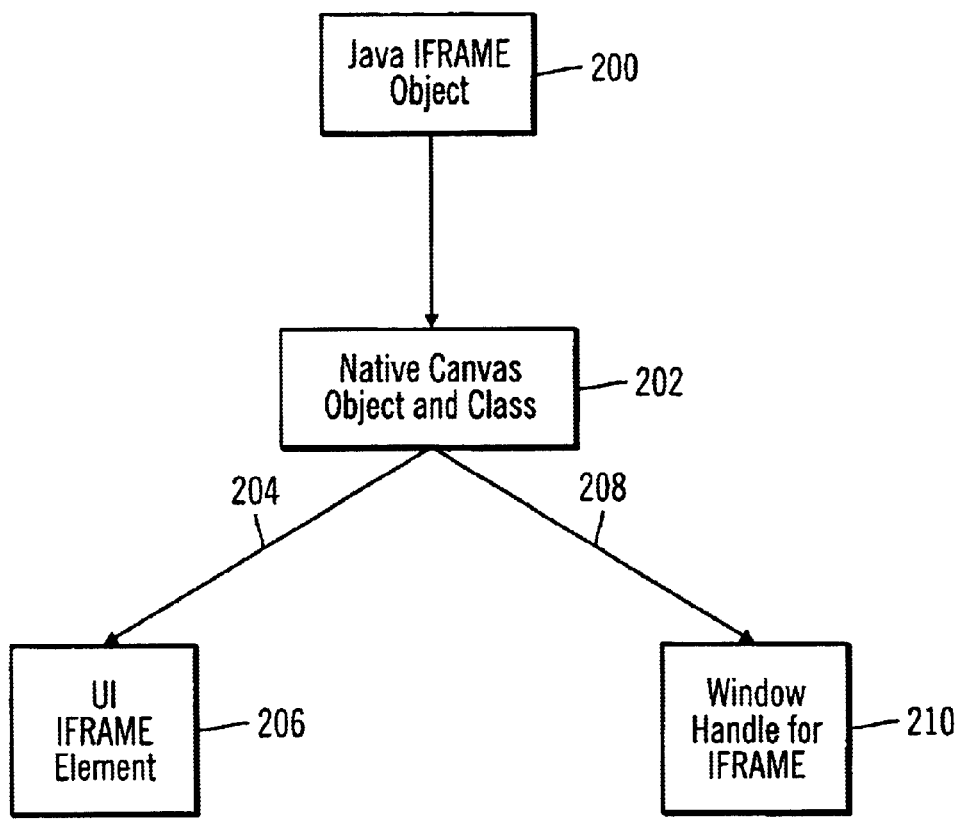
FIG. 4 illustrates data structures used to link a Java object representing a window used by an application program to a frame object included in a user interface object including GUI components for the user interface program.

FIG. 4 illustrates data structures to allow a plug-in application to execute in a window for which an IFRAME element is also maintained in the user interface DOM. This allows the window 610 in which the plug-in content is being rendered to be manipulated as an IFRAME element using W3C APIs, such as Cascading Style Sheets, so that the window 610 may be repositioned (FIG. 6C) and resized (FIG. 6B) in response to user generated events. When a plug-in program is activated, a Java IFRAME object 200 is created representing the inline frame or window in which the plug-in will render content. The Java IFRAME object 200 may be called by Java language statements in a mixed statement program. When the IFRAME element is first instantiated a NativeCanvas object and class 202 is also instantiated that provides a pointer 204 to a user interface IFRAME element 206, which is the user interface implementation of the IFRAME element in the user interface (UI) DOM. Also created is a pointer 208 to a window handler 210 for the GUI window of the IFRAME which is used by the plug-in and other processes to manipulate the GUI window into which the plug-in writes content. These pointers 204 and 208 are maintained by the bridge 4 which processes calls from the plug-in program or any other program including plug-in APIs and/or W3C APIs. In this way, the NativeCanvas object and class 202 provides the nexus between the user interface (UI) IFRAME element and the window handle that addresses the window implementing the IFRAME.

With respect to program statements, including W3C API calls and plug-in APIs, the bridge 4 would process such calls in a manner similar to how mixed program statements are processed according to the logic of FIG. 3a. In addition, when instantiating the Java IFRAME object 200 and user interface (UI) IFRAME 206 element, the bridge 4 would also create a NativeCanvas object and class 202 which provides pointers 204 and 208 to both the user interface (UI) IFRAME element 206 in the user interface (UI) DOM as well as the operating system window handle 210 to the window in which the IFRAME is implemented.

Figure 5:
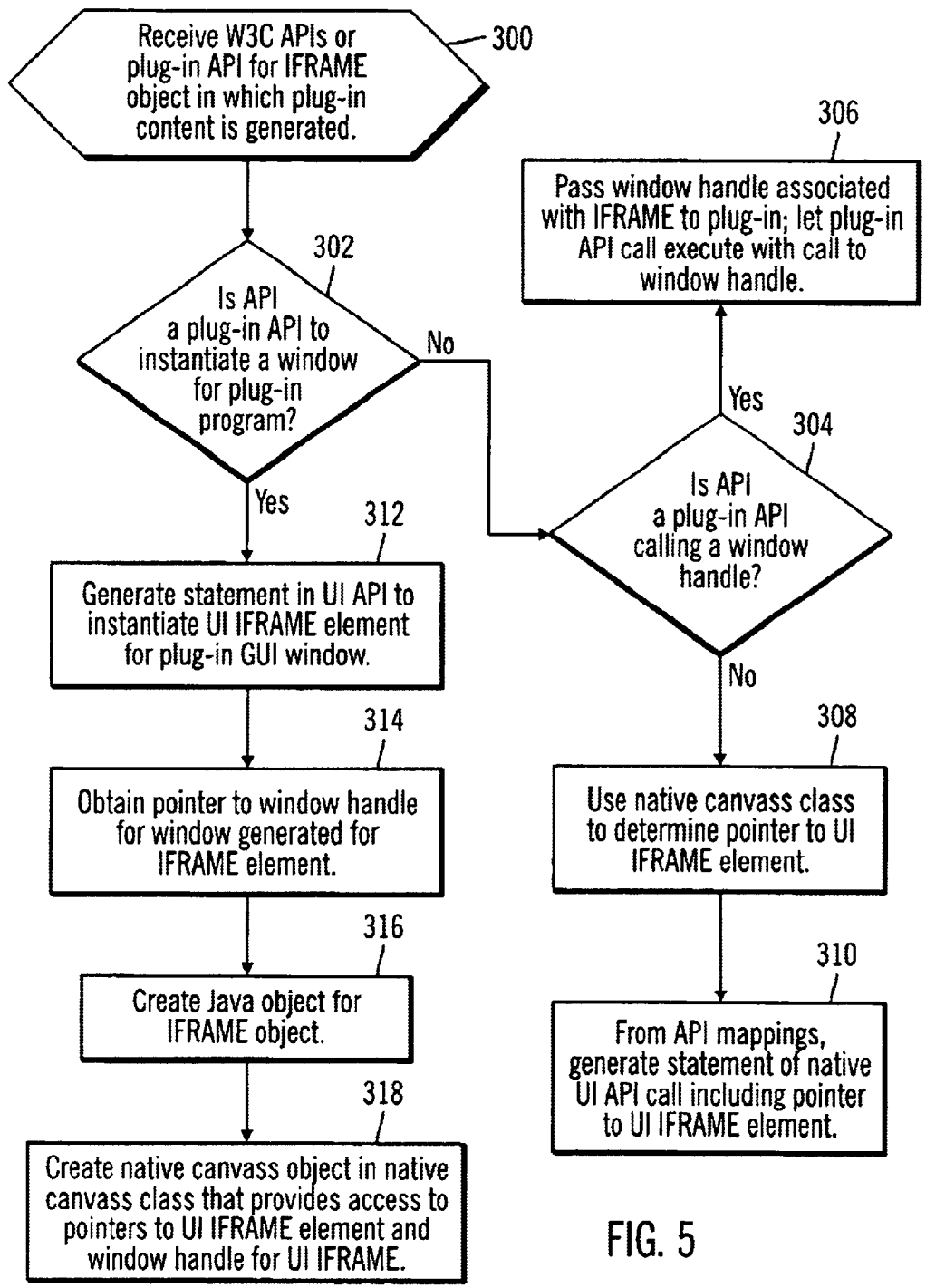
FIG. 5 illustrates logic to use standard API interfaces, such as W3C API interfaces, to manipulate the application GUI window.

FIG. 5 illustrates logic implemented in the bridge 4 to process statements related to a Java object implementing an IFRAME for a plug-in application program. These statements received by the bridge 4 may originate from the executing plug-in application, a separate mixed statement program including W3C APIs to manipulate the IFRAME in which the plug-in is manipulated, plug-in APIs, and/or W3C API and plug-in API events generated in response to user input to control the rendering of content in the plug-in window. Control begins at block 300 with the bridge 4 receiving W3C APIs or plug-in APIs for an IFRAME element in which the plug-in content is generated. If (at block 302) a plug-in API to initially create a window for the plug-in program is received, then the bridge 4 generates a user interface (UI) API to instantiate a user interface implementation of an IFRAME element 206 for the plug-in GUI window, into which the plug-in application will draw.

The bridge 4 will then obtain (at block 314) a pointer 208 from the operating system to the window handle 210 for the window generated for the UI IFRAME element 206. The bridge 4 will further create (at block 316) a java IFRAME object 200 for the IFRAME element of the plug-in, which the W3C APIs may call to manipulate the IFRAME window displaying the plug-in content. The bridge 4 will further instantiate (at block 318) a NativeCanvas object in the NativeCanvas class 202 that provides access to the pointers 204, 208 to the user interface (UI) IFRAME element 206 and window handle for the IFRAME 208, respectively.

If (at block 302) the received API is not a plug-in API to instantiate a window for an executing instance of the plug-in application, then the bridge 4 determines (at block 304) whether the received API is a plug-in API, which would call a window handle to use to draw into the window the operating system assigns to the plug-in application. If the API is a plug-in API, then the bridge 4 passes (at block 306) the pointer 208 to the window handle 210 to the plug-in API. The plug-in API then uses the received window handle to draw content into the window assigned to the IFRAME. Otherwise, if the API is not a plug-in API, then the API acting on the Java IFRAME object 200 is a W3C API. In such case, the bridge 4 uses (at block 308) the NativeCanvas object and class 202 to determine the pointer 204 to the user interface (UI) IFRAME element 206 for the plug-in window. The bridge 4 further uses the API mappings 8 (FIG. 1) to generate the user interface (UI) API implementing the received W3C API call. The user interface (UI) API call is made to the user interface (UI) IFRAME element 206 to perform the W3C API operation on the IFRAME which manipulates the window in which the plug-in content is generated.

In the prior art, plug-in applications may render content in a fixed-sized window embedded in a web page that cannot be resized or repositioned. With the preferred embodiment bridge architecture, plug-in applications may generate content into a window embedded in a user interface, such as an HTML page displayed by a web browser, that may also be manipulated as an IFRAME using W3C API commands. In this way, all the DOM features implemented in the browser for controlling the display of a window, such as Cascading Style Sheets, may apply to the embedded window displaying the plug-in application content. Preferred embodiments implement the window displaying the plug-in application content as an IFRAME to extend all the DOM features to the window displaying the plug-in application content.

Alternative Embodiments and Conclusions

The following describes some alternative embodiments for accomplishing the present invention.

The preferred embodiments may be implemented as a method, apparatus or information bearing media using standard programming and/or engineering techniques to produce software, firmware, hardware, or any combination thereof. The programs defining the functions of the preferred embodiment can be delivered to a computer via a variety of information bearing media, which include, but are not limited to, computer-readable devices, carriers, or media, such as a magnetic storage media, "floppy disk," CD-ROM, a file server providing access to the programs via a network transmission line, wireless transmission media, signals propagating through space, radio waves, infrared signals, etc. Of course, those skilled in the art will recognize that many modifications may be made to this configuration without departing from the scope of the present invention. Such information bearing media, when carrying computer-readable instructions that direct the functions of the present invention, represent alternative embodiments of the present invention.

In preferred implementations, the W3C API interfaces are provided and mapped to corresponding API interfaces in the user interface in which the mixed statement program will execute. However, alternative embodiments may allow the use of standard API interfaces other than W3C. For instance, if another set of API interfaces, not those proposed by W3C, is adopted industry wide, then the Bridge may provide mappings from those alternative industry standard API interfaces to the implementation of those standard APIs in a native operating system or web browser. In this way, the present invention for mapping standard interfaces may apply to allow the Java developer to utilize the API interface standards to access non-Java components in the operating system.

In preferred embodiments, the mixed statement programs include Java programming language statements, which are capable of being implemented on different operating system platforms. In further embodiments, the mixed statement programs may include code from other computer languages as well as alternative cross-platform languages other than Java. In such case, the preferred embodiments provide a methodology for extending standard API interfaces to programs to allow the developer to utilize the standard API interfaces to enhance the capabilities of the program and program language being used. With preferred embodiments, the programmer may write one application program or mixed statement program including code in the cross-platform computer language and include the industry standard API interfaces, and then use implementations of the bridge to allow the program to execute on different operating system through the browser layout engine.

Preferred embodiments described the user interface as a graphical user interface, such as a web browser. However, the user interface may be in any human observable format, such as voice interface, wherein the code in the mixed statement program generates voice commands.

In non-Java implementations, a virtual machine program may be provided to translate the application program to code that is independent of the operating system platform, and then transform the operating system independent bytecodes to native operating system object code.

The bridge may be implemented in a JDK kit including the Java virtual machine. The Java Virtual Machine may be provided as a software kit that is installed as an application program or embedded in a ROM or flash memory.

Preferred embodiments described the bridge mapping W3C API interfaces to corresponding interfaces in Mozilla browsers and the Microsoft Internet Explorer 5. However, there may be further implementations of the bridge to provide API for any browser that implements aspects of the W3C DOM standard, including DOM level 1, all of the W3C HTML 4.0, and parts of the DOM level 2, including the CORE, HTML, Events, StyleSheets, and Cascading Style Sheets.

Preferred embodiments were described with respect to using the W3C API interfaces to access user interface objects, such as COM and XPCOM objects, which is the format of component objects in the Internet Explorer and Mozilla browser user interfaces, respectively. However, the bridge may map the W3C API interfaces to interfaces in any supported user interface program to access the objects in the format for that user interface. For instance, the bridge 4 may be used to interface with objects in the IBM System Object Model (SOM) format.

Mixed statement programs may be executed on any computing device that is capable of executing the bridge to transform the mixed statement code to either the native operating system code used by the computing device or the user interface APIs 12 and objects 14.

The preferred algorithm described particular steps as occurring in a particular order. However, in further embodiments the order of the steps may be changed and certain steps removed and added without departing from the scope of the invention. Moreover, different steps may be performed to execute the overall operation of the algorithm.

Preferred embodiments were described with respect to providing an IFRAME implementation for plug-in programs used by web browsers. However, in further embodiments, the plug-in programs may comprise any application program that provides services and features to any type of user interface program.

In summary, the present invention provides a method, system, and program for generating an application graphical user interface (GUI) window used by an executing application program. The application program uses an operating system handle addressing the application GUI window to generate content into the application GUI window. A frame element, including GUI components of the application GUI window is added to a user interface object including GUI components used by a user interface program. Application program interfaces (APIs), generated by the application program, are executed to call the handle to generate content into the application GUI window. Standard APIs that are members of a set of standard API interfaces are received to manipulate the GUI components in the frame element to modify a display of the application GUI window. The standard APIs are converted to user interface APIs. The converted user interface APIs call the frame element to render the application GUI window according to the modifications specified in the standard APIs.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for generating an application graphical user interface (GUI) window used by an executing application program, wherein the application program uses an operating system handle addressing the application GUI window to generate content into the application GUI window, comprising:

creating a frame element when receiving an application API to create the application GUI window, wherein a pointer to the frame element is used to manipulate GUI components in the frame element;

adding tie frame element, including GUI components of the application GUI window, into a user interface object including GUI components used by a user interface program;

creating a standard frame object for the frame element;

instantiating a native object and class that links the standard frame object with the frame element added into the user interface object and with tie handle addressing the application GUI window;

executing application program interfaces (APIs), generated by the application program, to call the handle to generate content into the application GUI window;

receiving standard APIs that are members of a set of standard API interfaces to manipulate the GUI components in the frame element to modify a display of the application GUI window;

conveting the standard APIs to user interface APIs; and calling, with the converted user interface APIs, the frame element to render the application GUI window according to the modifications specified in the standard APIs.

2. The method of claim 1, wherein the user interface program comprises a web browser program and the application program comprises a plug-in module that provides services and features to the web browser program.

3. The method of claim 2, wherein the application GUI window is generated as embedded in a user interface GUI window.

4. The method of claim 1, wherein the set of standard API interfaces are part of the W3C Document Object Mode (DOM) specification and the user interface program implements the W3C DOM.

5. The method of claim 4, wherein the user interface object comprises a DOM tree and wherein the frame element comprises an IFRAME element in the user interface DOM tree.

6. The method of claim 1, further comprising:

passing the handle addressing the application GUI window to the application API to use to generate content into the application GUI window.

7. A method for generating an application graphical user interface (GUI) window used by an executing application program, wherein the application program uses an operating system handle addressing the application GUI window to generate content into the application GUI window, comprising:

creating a frame element in a user interface object when receiving an application API to create the application GUI window;

instantiating a native object and class;

maintaining a pointer to the frame element with the native object and class, wherein the pointer is used with standard API calls to manipulate the GUI components in the frame element;

maintaining a pointer to a handle to the created application GUI window with the native object and class, wherein the pointer is used with application APIs to generate content into the application GUI window;

adding the frame element, including GUI components of the application GUI window, into a user interface object including GUI components used by a user interface program;

executing application program interfaces (APIs), generated by the application program, to call the handle to generate content into the application GUI window;

receiving standard APIs that are members of a set of standard API interfaces to manipulate the GUI components in the frame element to modify a display of the application GUI window; converting the standard APIs to user interface APIs; and calling, with the converted user interface APIs, the frame element to render the application GUI window according to the modifications specified in the standard APIs.

8. The method of claim 7, further comprising creating a standard frame object implementing the frame element that is called by the standard APIs manipulating the frame element, wherein the standard frame object is used to determine the frame element included in the user interface object when converting the standard API to the user interface API.

9. The method of claim 8, further comprising instantiating a native object and class that links the standard frame object with the frame element included in the user interface object.

10. A system for generating an application graphical user interface (GUI) window, comprising:
  a computer;
  a display monitor controlled by the computer, wherein the computer controls the display of the application GUI window on the display monitor; and
  program logic executed by the computer, wherein the program logic includes code capable of causing the computer to perform:
    executing an executing application program, wherein the application program uses an operating system handle addressing the application GUI window to generate content into the application GUI window;
    creating a frame element when receiving an application API to create the application GUI window, wherein a pointer to the frame element is used to manipulate GUI components in the frame element;
    adding the frame element, including GUI components of the application GUI window, into a user interface object including GUI components used by a user interface program;
    creating a standard frame object for the frame element;
    instantiating a native object and class that links the standard frame object with the frame element added into the user interface object and with the handle addressing the application GUI window;
    executing application program interfaces (APIs), generated by the application program, to call the handle to generate content into the application GUI window;
    receiving standard APIs that are members of a set of standard API interfaces to manipulate the GUI components in the frame element to modify a display of the application GUI window;
    converting the standard APIs to user interface APIs; and
    calling, with the converted user interface APIs, the frame element to render the application GUI window according to the modifications specified in the standard APIs.

11. The system of claim 10, wherein the user interface program comprises a web browser program and the application program comprises a plug-in module that provides services and features to the web browser program.

12. The system of claim 11, wherein the application GUI window is generated as embedded in a user interface GUI window.

13. The system of claim 11, wherein the set of standard API interfaces are part of the W3C Document Object Model (DOM) specification and the user interface program implements the W3C DOM.

14. The system of claim 13, wherein the user interface object comprises a DOM tree and wherein the frame element comprises an IFRAME element in the user interface DOM tree.

15. The system of claim 10, wherein the program logic is further capable of causing the computer to perform:
  passing the handle addressing the application GUI window to the application API to use to generate content into the application GUI window.

16. A system for generating an application graphical user interface (GUI) window, comprising:
  a computer;
  a display monitor controlled by the computer, wherein the computer controls the display of the application GUI window on the display monitor;
  program logic executed by the computer, wherein the program logic includes code capable of causing the computer to perform:
    creating a frame element in the user interface object when receiving an application API to create the application GUI window;
    instantiating a native object and class;
    maintaining a pointer to the frame element with the native object and class, wherein the pointer is used with standard API calls to manipulate the GUI components in the frame element;
    maintaining a pointer to the handle to the created application GUI window with the native object and class, wherein the pointer is used with application APIs to generate content into the application GUI window;
    executing an executing application program, wherein the application program uses an operating system handle addressing the application GUI window to generate content into the application GUI window;
    adding a frame element, including GUI components of the application GUI window, into a user interface object including GUI components used by a user interface program;
    executing application program interfaces (APIs), generated by the application program, to call the handle to generate content into the application GUI window;
    receiving standard APIs that are members of a set of standard API interfaces to manipulate the GUI components in the frame element to modify a display of the application GUI window; and
    converting the standard APIs to user interface APIs; and
    calling, with the converted user interface APIs, the frame element to tender the application GUI window according to the modifications specified in the standard APIs.

17. The system of claim 16, wherein the program logic is further capable of causing the computer to perform creating a standard frame object implementing the frame element that is called by the standard APIs manipulating the frame element, wherein the standard frame object is used to determine the frame element included in the user interface object when converting the standard API to the user interface API.

18. The system of claim 17, wherein the program logic is further capable of causing the computer to perform instantiating a native object and class that links the standard frame object with the frame element included in the user interface object.

19. A program for generating an application graphical user interface (GUI) window used by an executing application program, wherein die application program uses an operating system handle addressing the application GUI window to generate content into the application GUI window, and wherein the program is embedded in a computer readable medium and includes code capable of causing the a computer to perform:
  creating a frame element when receiving as application API to create the application GUI window, wherein a pointer to the frame element is used to manipulate GUI components in the frame element;
  adding the frame element, including GUI components of the application GUI window, into a user interface object including GUI components used by a user interface program;
  creating a standard frame object for the frame element;

instantiating a native object and class that in the standard frame object with the frame element added into the user interface object and with the handle addressing the application GUI window;

executing application program interfaces (APIs), generated by the application program, to call the handle to generate content into the application GUI window;

receiving standard APIs that are members of a set of standard API interfaces to manipulate the GUI components in the frame element to modify a display of the application GUI window;

converting the standard APIs to user interface APIs; and calling, with the converted user interface APIs, the frame element to render the application GUI window according to the modifications specified in the standard APIs.

20. The program of claim 19, wherein the user interface program comprises a web browser program and the application program comprises a plug-in module that provides services and features to the web browser program.

21. The program of claim 20, wherein the application GUI window is generated as embedded in a user interface GUI window.

22. The program of claim 19, wherein the set of standard API interfaces are part of the W3C Document Object Model (DOM) specification and the user interface program implements the W3C DOM.

23. The program of claim 22, wherein the user interface object comprises a DOM tree and wherein the frame element comprises an IFRAME element in the user interface DOM tree.

24. The program of claim 19, wherein the program code is further capable of causing the computer to perform:

passing the handle addressing the application GUI window to the application API to use to generate content into the application GUI window.

25. A program for generating an application graphical user interface (GUI) window used by an executing application program, wherein the application program uses an operating system handle addressing the application GUI window to generate content into the application GUI window, and wherein the program is embedded in a computer readable medium and includes code capable of causing the a computer to perform:

creating a frame element in the user interface object when receiving an application API to create the application GUI window;

instantiating a native object and class;

maintaining a pointer to the frame element with the native object and class, wherein the pointer is used with standard API calls to manipulate the GUI components in the frame element;

maintaining a pointer to the handle to the created application GUI window with the native object and class, wherein the pointer is used with application APIs to generate content into the application GUI window;

adding a frame element, including GUI components of the application GUI window, into a user interface object including GUI components used by a user interface program;

executing application program interfaces (APIs), generated by the application program to call the handle to generate content into the application GUI window;

receiving standard APIs that are members of a set of standard API interfaces to manipulate the GUI components in the frame element to modify a display of the application GUI window; and converting the standard APIs to user interface APIs; and calling, with the converted user interface APIs, the frame element to render the application GUI window according to the modifications specified in the standard APIs.

26. The program of claim 25, wherein the program code is further capable of causing the computer to perform creating a standard frame object implementing the frame element that is called by the standard APIs manipulating the frame element wherein the standard frame object is used to determine the frame element included in the user interface object when converting the standard API to the user interface API.

27. The program of claim 26, wherein the program code is further capable of causing the computer to perform instantiating a native object and class that lines the standard fame object with the frame element included in the user interface object.

* * * * *

UNITED STATES PATENT AND TRADEMARK OFFICE
CERTIFICATE OF CORRECTION

PATENT NO. : 6,801,224 B1
APPLICATION NO. : 09/661610
DATED : October 5, 2004
INVENTOR(S) : Stephen Richard Lewallen It is certified that error appears in the above-identified patent and that said Letters Patent is hereby corrected as shown below:

Column 13, lines 56 and 63, delete "tie" and insert -- the -- .

Column 14, line 5, delete "conveting" and insert -- converting -- .
Line 56, insert as new paragraph beginning with "converting the standard APIs...".

Column 15, line 48, delete "claim 11 " and insert -- claim 10 -- .
Line 53, delete "clement" and add -- element -- .

Column 16, line 53, delete "die" and insert -- the -- .
Line 57, delete "the a computer" and add -- a computer -- .

Signed and Sealed this

Second Day of January, 2007

JON W. DUDAS
*Director of the United States Patent and Trademark Office*